July 8, 1969  B. MADIGAN  3,454,800

FILM DRIVE MECHANISM

Filed June 22, 1967

INVENTOR.
BASIL MADIGAN
BY
*Oldham & Oldham*
ATTORNEYS

United States Patent Office 3,454,800
Patented July 8, 1969

3,454,800
FILM DRIVE MECHANISM
Basil Madigan, Wadsworth, Ohio, assignor to Goodyear Aerospace Corporation, Akron, Ohio, a corporation of Delaware
Filed June 22, 1967, Ser. No. 648,135
Int. Cl. H02p 15/00; H02k 49/00
U.S. Cl. 310—94                                    9 Claims

ABSTRACT OF THE DISCLOSURE

A film drive mechanism which includes a tension balancing system adapted to control the power required to translate the film, and also to maintain a nearly uniform tension on the film regardless of whether it translates, reverses, or remains stationary. A tension balancing capstan is provided which has an outer portion positioned in direct contact with the web to measure differences in film tension and film position relative thereto, and an inner portion connected to and controlling a control potentiometer associated with a separate drive means for each web carrying spool. A difference in film tension is indicated to correct film tension unbalance about the capstan. The potentiometers control the torque output of the film spools by adjustably limiting the energization of clutches for the respective drive means and allowing electric slip in the normal spool on rotation of the drive means.

---

Heretofore there have been many types and kinds of film drive mechanisms which have included some type of tension balancing system but, insofar as I am aware, none of the systems provided overcome the basic problem of being able to reverse the film drive mechanism quickly so as to eliminate any slack, but at the same time to not reverse the film so suddenly that a snapping action occurs which damages, scratches, and possibly breaks the film.

It is the general object of the present invention to provide a film drive mechanism equipped with a tension balancing system which drives the film rapidly, but yet quickly readjusts tension on the film drive spools when unbalance occurs. This continuous hunt for proper tension balance on the film spool rolls to eliminate slack in the film occurs quickly and rapidly, and slack is efficiently eliminated without snapping, breaking, or scratching the film.

Another object of the present invention is to provide a hysteresis or magnetic particle clutch associated with each drive motor for the film spools, with such a clutch controlling efficiently the amount of torque transferred to the film spools so as to keep the proper tension on the film spools to eliminate slack in the film.

Another object of the invention is to provide a tension balancing capstan constructed in the form of a differential which automatically repositions a control potentiometer associated with each hysteresis or magnetic particle clutch. The potentiometer controls the torque output on the respective film spools of the film drive mechanism by adjustably limiting the energization of the respective hysteresis or magnetic particle clutch associated with each drive spool.

Figure 1:
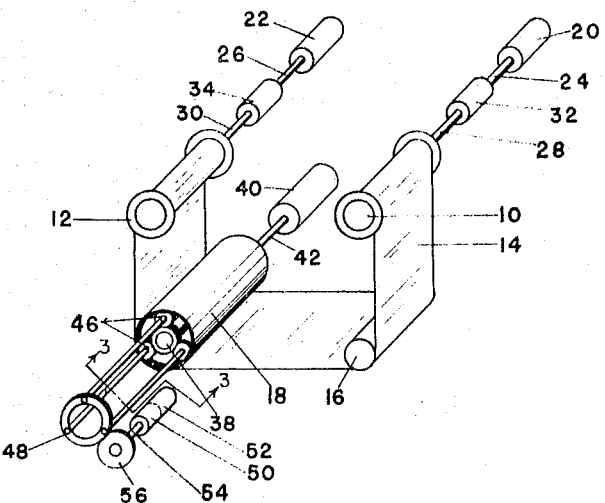
Figure 2:
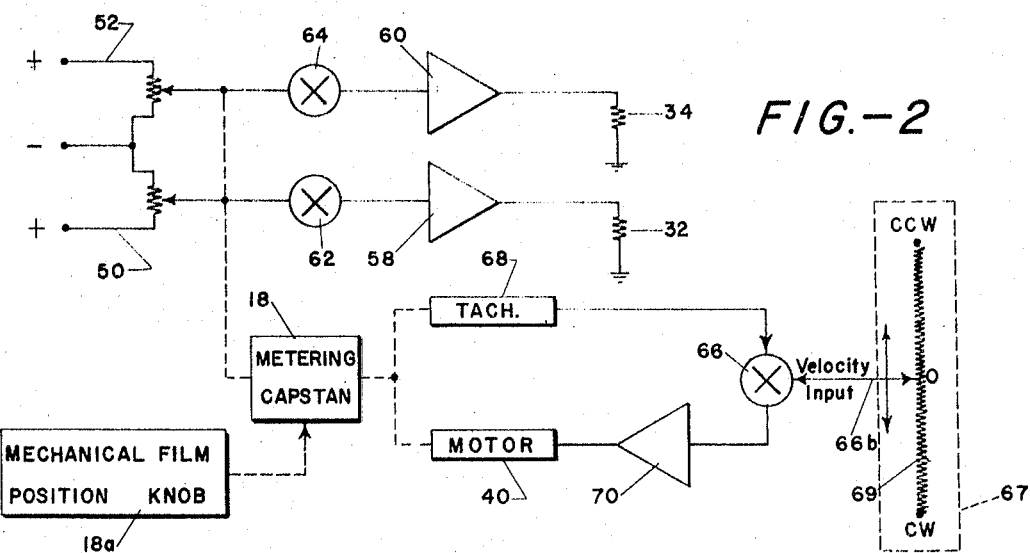
Figure 3:
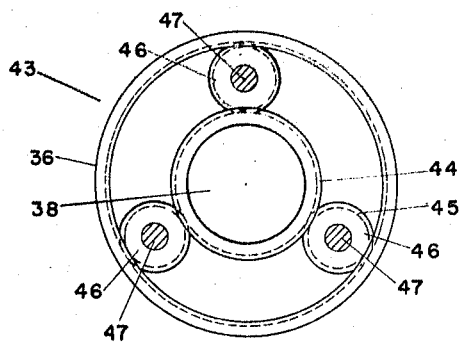

In the drawings, FIG. 1 is a diagrammatic, perspective view of a preferred embodiment of the apparatus of the invention;

FIG. 2 is a schematic of the tension balancing system and drive mechanism shown in FIG. 1; and FIG. 3 is an enlarged end elevation as seen from line 3—3 of FIG. 1 particularly illustrating the gearing of the film metering capstan of the invention.

It should be understood that the apparatus of the invention is adapted to translate and tension, so as to eliminate slack, any web, film, or the like. The most common usage, however, is in a film drive mechanism such as an optical projector or the like and the invention has been so described and illustrated.

Referring first to FIG. 1, numerals 10 and 12 indicate suitable spools adapted to have a film 14 wound thereon. Supporting the film 14 between the two spools 10 and 12 are a roller 16 and a tension balancing capstan, indicated generally by numeral 18. The purpose of the roller 16 is simply to aid in the support and tensioning of the film 14 as it translates from spool 10 to spool 12, or vice versa, and the purpose of the tension balancing capstan 18, which comprises one of the important elements of the invention, will be described hereinafter.

A pair of drive motors 20 and 22, having drive shafts 24 and 26, respectively, as will be explained in a greater detail hereinafter, serve as suitable power sources to rotatably drive spools 10 and 12. Positioned between the motor shafts 24 and 26 and drive shafts 28 and 30 of the spools 10 and 12, are a pair of magnetic particle or hysteresis clutches 32 and 34. Hysteresis clutch 32 operatively connects drive shaft 24 with drive shaft 28 and acts to transfer the drive from motor 20 to film spool 10. Hysteresis or magnetic particle clutch 34 likewise operatively connects drive shaft 26 with drive shaft 30 and acts to transfer the drive from motor 22 to film spool 12. The shafts 28 and 30 are connected in fixed relation to their respective spools 10 and 12. The shafts 28 and 30 are connected in fixed relation to their respective spools 10 and 12. As is well known, these clutches have the characteristic of transferring torque proportional to voltage or current input. Thus, the amount of voltage or current passed to each of the respective clutches 32 and 34, in effect, controls the torque output of film spools 10 and 12. The invention contemplates that each of the motors 20 and 22 will be driven at approximately the same constant speed to provide a normal spool on rotation for their respective spools 10 and 12.

The amount of voltage or current passed to the respective hysteresis clutches 32 and 34, and, as naturally follows, the amount of torque transmitted to film spools 10 and 12, is controlled by the tension balancing capstan 18. The capstan 18 is mechanically constructed in the form of a differential and is made up of a cylindrically shaped outer housing 36 and a concentrically mounted inner shaft 38. The outer peripheral surface of outer housing 36 firmly engages the film 14 and is adapted to rotate in the direction the film is moving by a friction contact therewith when the film translates from one spool to the other. A drive motor 40 having a drive shaft 42 operatively connects to the concentrically mounted inner shaft 38, and the drive motor 40, acting through drive shaft 42, selectively effects a rotation on the inner shaft 38. A mechanical film position knob 18a, as best seen in FIG. 2, provides means to mechanically adjust the capstan position as desired.

As is best indicated by FIG. 3 a gearing assembly generally indicated by the numeral 43 is operatively mounted on the end of the metering capstan 18. A fixed gear 44 is mounted on the end of inner shaft 38, and a fixed internal ring gear 45 is mounted on the end of outer housing 36, both gears 44 and 45 rotating with their respective shafts. A plurality of walking gears 46 are received between the two fixed gears 44 and 45, said walking gears 46 being adapted to be driven either by gear 44 if inner shaft 38 is rotating, or by gear 45 if outer housing 36 is rotating, or by both gears if both are rotating. Fixedly mounted on each walking gear 46 and axially extending therefrom is a rod 47, the other end of each rod being journalled in a gear ring 48.

A pair of control potentiometers 50 and 52 are positioned substantially in adjacent relationship with the balancing capstan 18 and a suitable shaft 54 adapted to reposition the potentiometers is connected thereto. A gear 56 is mounted on shaft 54, and gear 56 engages with and is driven by gear ring 48. Thus any rotation of gear ring 48 acting through gear 56 and shaft 54, tends to reposition each of the control potentiometers 50 and 52. The potentiometers are in opposed relation so rotation of shaft 56 increase the resistance of one, while the resistance of the other is decreased. As is best indicated by FIG. 2, potentiometer 50 controls the amount of voltage or current passed to clutch 32 and potentiometer 52 controls, in an inverse relationship, the amount of voltage or current passed to clutch 34. Amplifiers 58 and 60 may be used to amplify the signal transferred from the potentiometers to the respective hysteresis clutches 32 and 34, and a pair of tension biases 62 and 64 set the basic tension level on the film 14 by providing a steady and selectively controlled flow of current to the respective hysteresis clutches.

In the actual operation of the tension balancing system of the invention while the film remains stationary, with no translating from one spool to the other, tension biases 62 and 64 tend to rotate the spools 10 and 12 in a spool on direction so that any slack in the film is eliminated. It should be noted that the bias produced by the tension biases 62 and 64 can be adjustably controlled so that films of varying tensile strength can be translated from one film spool to the other with the same tension balancing system. Ordinarily, the tension biases 62 and 64 will be set so that the bias produced is approximately 50% of the tension capability of the web translated by the apparatus.

When it is desired to translate the film to one spool or the other, a velocity servo 66 illustrated only schematically in FIG. 2, is repositioned by means of a control switch either manually or automatically so that the amount and flow of current through the motor 40 can be selectively adjusted. For example, switch 67 shown in dotted lines in FIG. 2, can manually or automatically swing servo arm 66b selectively along control 69 so that the direction of flow of current in a clockwise or counter-clockwise direction can be controlled. Also the further servo arm 66b is moved away from the zero volt position, the greater current flow through motor 40. The precise minute that motor 40 is actuated and drive shaft 42 begins to rotate, it will drive inner shaft 38 of the metering capstan 18.

As inner shaft 38 begins its rotation, gear 44 secured to the end thereof also will rotate. Since gear 45 secured to outer shaft 36 of the metering capstan 18 will remain stationary, the walking gears 46 will begin to walk around gear 45 in the direction of rotation of inner shaft 38. Such a walking action of the walking gears 46 begins a synchronous rotation of the rods 47 and ring gear 48 carried thereby. As the ring gear 48 rotates, it drives gear 56 and shaft 54 secured thereto. As explained hereinbefore, and as schematically illustrated by FIG. 2, any rotation of shaft 54 causes a repositioning of control potentiometers 50 and 52. An inverse repositioning of the potentiometers results in a tension unbalance so that the tendency for one or the other of the film spools 10 or 12 to wind the film 14 thereon is overcome. The film will at that time start to translate from one spool to the other with the moving film causing the outer housing shaft 36 of the metering capstan 18 also to rotate. As can be readily seen and understood, once the outer shaft 36 begins to rotate and finally achieves the same speed of rotation as inner shaft 38 but in the opposite direction thereto, walking gears 46 positioned on the end of the capstan 18 will remain stationary, with it necessarily following that ring gear 48 also will remain stationary.

If at any time the film begins to slack, this will be immediately sensed by the tension balancing capstan 18 since the rotation of the outer housing 36 will slow down in relation to inner shaft 38. As this occurs, walking gears 46 will once again start to roll around inner shaft 38 carrying ring gear 48 therewith so that the control potentiometers 50 and 52 will be repositioned and the film slack eliminated. As can be readily appreciated, the tension balancing capstan, due to its unique design, rapidly and quickly notes and corrects any film slack without danger of snapping or stretching the film 14.

As illustrated by FIG. 2, a tach 68 and an amplifier 70 are associated with the control motor 40 so that the entire tension balancing system operates with low watt output and can be efficiently associated with a large film drive mechanism. Also, it should be noted that the motor 40 simply provides means to rotate the capstan drive shaft 42 so that a tension unbalance can be created in order to begin to translate the film 14 from one spool to the other. Any suitable means could be substituted therefor. The tach 68 may show the speed of rotation of shaft 42 and hence be a reference to the translation speed of the film or web.

While a certain representative embodiment and details have been shown for the purpose of illustrating the invention, it will be apparent to those skilled in this art that various changes and modifications may be made therein without departing from the spirit or scope of the invention.

What is claimed is:

1. A tension balancing system for a film drive mechanism or the like, including
   two spools positioned substantially in alignment with each other,
   a web wound at each end thereof onto a respective spool,
   independent drive means for each of said spools, rotating each spool in a spool on direction,
   a control potentiometer associated with said drive means, said potentiometer controlling the torque output of the film spools by adjustably limiting the energization of their respective drive means and allowing electrical slip in the normal spool on rotation of the drive means, and
   a tension balancing capstan having an outer portion positioned in direct contact with the web to measure differences in film tension and film position relative thereto, and an inner portion connected to and controlling the potentiometer when a difference in film tension is indicated to correct film tension unbalance about the capstan.

2. The combination according to claim 1 wherein a control potentiometer is associated with each drive means and wherein the inner portion of the capstan controls the potentiometers inversely to each other when a difference in film tension is indicated by said outer portion of the capstan.

3. The combination according to claim 1 wherein said tension balancing capstan includes,
   an outer housing,
   an inner shaft journalled in said outer housing,
   drive means rotating said inner shaft independently of any rotational movement of said outer housing,
   gearing means monitoring differences between rotational movement of said inner shaft and said outer housing,
   connecting means between said gearing means and said control potentiometer whereby said connecting means repositions the control potentiometer in response to the monitored differences of said gearing means.

4. The combination according to claim 3 wherein said tension balancing capstan takes the form of a differential one input being the rotation of said inner shaft by said drive means, and a second input being rotation imparted to said outer housing by the web frictionally engaging therewith as the web passes over the outer peripheral surface of said outer housing.

5. The combination according to claim 1 which includes a hysteresis clutch between each spool and its respective drive means and where the control potentiometer is associated with each hysteresis clutch, and where each hysteresis clutch has a selective input of tension bias current in addition to the tension unbalance input coming from the respective control potentiometer.

6. The combination according to claim 5 wherein a pair of differential amplifiers receive and amplify the tension bias input and the tension unbalance input to the respective hysteresis clutch.

7. In a film tension control apparatus the combination of
   a pair of spools,
   a web attached at each end to a respective spool and wound thereon so as to extend between spools,
   drive means normally independently rotating each spool in a spool on direction,
   hysteresis clutch means mechanically positioned between each drive means and its respective spool to selectively control the interconnection of the drive means to the spool and allow electrical slip in the normal spool on rotation of the drive means,
   a cylindrically shaped differential capstan positioned so the web passes around a portion of the circumference thereof, said capstan comprising
     an input shaft concentrically aligned and rotatably mounted within the capstan,
     walking gears mechanically connecting the input shaft to the capstan, and
     a ring gear actuated by walking movement of the walking gears,
     a pair of interconnected potentiometers set in opposed relation and directly connected to the ring gear wherein the normal position of the ring gear both potentiometers are equally balanced, and where each potentiometer controls the current supply to a respective hysteresis clutch means, and
   means to selectively control rotation to the input shaft of the differential capstan.

8. A control apparatus according to claim 7 where each drive means operates at the same constant speed, and where each clutch is supplied with a constant bias current dependent upon the tension capabilities of the web.

9. A control apparatus according to claim 7 where the web makes substantially a 90° angle passing around the capstan.

References Cited

UNITED STATES PATENTS

| | | | |
|---|---|---|---|
| 2,509,286 | 5/1950 | Blain | 318—7 |
| 3,026,452 | 3/1962 | Frankenfield | 310—95 |
| 3,203,636 | 8/1965 | Owen | 242—75.51 |
| 3,218,219 | 11/1965 | Sherman | 242—75.51 |
| 3,318,546 | 5/1967 | Bejach | 242—75.51 |
| 3,348,107 | 10/1967 | Hamby | 242—75.51 |

WARREN E. RAY, *Primary Examiner.*

R. SKUDY, *Assistant Examiner.*

U.S. Cl. X.R.

310—98